United States Patent [19]

Bowen et al.

[11] 4,419,185

[45] Dec. 6, 1983

[54] PYROLYSIS SYSTEM WITH HOT GAS RECIRCULATION

[75] Inventors: Mack D. Bowen, Smyrna; Kenneth R. Purdy, Decatur, both of Ga.

[73] Assignee: American Carbons, Inc., Atlanta, Ga.

[21] Appl. No.: 283,033

[22] Filed: Jul. 16, 1981

[51] Int. Cl.³ .................. C10B 49/06; C10B 53/02
[52] U.S. Cl. .......................... 201/4; 201/15; 201/29; 201/34; 201/44
[58] Field of Search ............... 201/4, 15, 22, 25, 27, 201/29, 34, 39, 44, 45; 44/1 E, 1 F

[56] References Cited

U.S. PATENT DOCUMENTS

| | | | |
|---|---|---|---|
| 1,858,972 | 5/1932 | Snyder | 201/29 |
| 2,289,917 | 7/1942 | Lambiotte | 201/34 |
| 3,841,992 | 10/1974 | Jones et al. | 201/34 |
| 4,116,810 | 9/1978 | Jones et al. | 201/34 |
| 4,134,794 | 1/1979 | Lorenz et al. | 201/34 |
| 4,145,256 | 3/1979 | Bowen | 201/25 |
| 4,148,692 | 4/1979 | Chu et al. | 201/34 |
| 4,165,216 | 8/1979 | White et al. | 201/34 |
| 4,230,602 | 10/1980 | Bowen et al. | 201/25 |
| 4,235,675 | 11/1980 | Bechthold | 201/25 |
| 4,260,473 | 4/1981 | Bauer | 201/25 |

FOREIGN PATENT DOCUMENTS

| | | |
|---|---|---|
| 19641 | 12/1980 | European Pat. Off. |
| 135733 | 5/1979 | German Democratic Rep. ... 201/29 |
| 1321069 | 6/1973 | United Kingdom |
| 1364519 | 8/1974 | United Kingdom |
| 1520041 | 8/1978 | United Kingdom |

OTHER PUBLICATIONS

Bowen et al.; "Solid Wastes & Residues"; ACS Symposium Series 76; 1978; pp. 94–125.

Primary Examiner—Bradley Garris

[57] ABSTRACT

A process and system for continuously pyrolyzing organic feedstock produces a solid carbonaceous residue of controlled volatility, in a manner that is highly energy efficient. The value of the gaseous product and of the pyrolytic oil produced are also optimized.

27 Claims, 1 Drawing Figure

PYROLYSIS SYSTEM WITH HOT GAS RECIRCULATION

BACKGROUND OF THE INVENTION

It is well known that organic, and in particular cellulosic, materials can be pyrolyzed to produce valuable solid residue products, including charcoal, low-volatile carbon and activated carbon, as well as gaseous and liquid fuels. Exemplary of the prior art that describes such processes is Bowen U.S. Pat. No. 4,145,256; a pyrolysis process specifically adapted for the production of highly activated carbon is disclosed in Bowen and Purdy U.S. Pat. No. 4,230,602.

In such processes, typically carried out in a vertical-shaft reactor, air and/or steam will be introduced into the high-temperature zone where the principal reactions take place, with the specifications for the solid residue product dictating the amounts thereof to be employed. If, for example, the product is to be a high-volatile carbon suitable for use as a charcoal briquette feedstock, the air will be maintained at a practicable minimum, and no steam will be used. For a low-volatile carbon suitable for use as a chemical feedstock, the air will normally be controlled to a rate slightly above its practicable minimum, and again steam will not be required. Finally, to produce an activated carbon, steam will be introduced, and air sufficient to support the endothermic oxidation of the "fixed" carbon residue, and to thereby activate it, will be used.

In any such process, the offgas stream will contain organic oil (condensible) vapors and gas (noncondensible) vapors, water vapor (at least from residual feedstock moisture), and products of thermochemical reactions with any air or steam that is introduced; it will also contain entrained solid particulates. For reasons of practicability, economy and energy conservation, it is a good practice to keep the temperature of the offgas stream within certain limits and, in processes for the production of solid products ranging from charcoal to low-volatile carbon, this can be accomplished by careful control of the amount of air introduced and of the moisture content of the feedstock. In the production of activated carbon products, the feedstock moisture content is the primary controlling parameter.

In such prior art processes, the thermal energy required to pyrolyze, or to pyrolyze and activate, the solid residue, as the case may be, is generated by burning a portion of the combustible gases and vapors that are produced in the conversion process, the air injected being furnished at a rate adequate to support such reactions; very high local gas temperatures, on the order of 2800° Fahrenheit, result. Moreover, horizontal-bed temperature nonuniformity is a significant factor, since it is found that, if the local bed temperature at the points of air-injection is not maintained at a value of at least about 1800° Fahrenheit, the local thermal energy generation (exothermic oxidation reactions) will become unstable, resulting in unsatisfactory variations in the volatility of the solid product. Such instabilities can indeed lead to complete loss of process control.

Exposing a portion of the solid residue to elevated temperatures for an excessive period of time will, of course, cause its complete devolatilization. Therefore, to obtain a product with a higher volatiles content it is necessary to minimize residence times in the high-temperature zone of the reactor and to quench the char quickly, and even then there will be wide variations in volatiles content from particle to paticle. Taking into consideration all of these factors (i.e., short residence times, relatively high minimum stable bed temperature, and very high local gas temperatures), together with the fact that the downward flowing solid residue will be far from a state of thermal equilibrium with the upward flowing gases, it becomes evident that the control of such a process for the production of a solid carbonaceous product having a predetermined volatility specification, on a continuous basis, is most difficult to achieve.

In specific terms, using wood chips in a continuous, long-residence-time process for producing carbon products containing up to about 20 to 21 percent of volatiles (18 percent being considered a good high-volatile product), it has been found that the maximum temperature to which the solid residue can be heated is about 800° to 1400° Fahrenheit, the percentage of volatiles being inversely related to temperature and being expressed on the basis of the weight of solid product, exclusive of all water and water vapor. As a further indication of the close control required, it is noted that a relatively small temperature variation will produce a substantial change in the volatiles content. Thus, heating the residue to about 1200° rather than 1000° Fahrenheit will reduce the volatility level of the product from about 12.7 to 5.7 percent.

In addition to the foregoing, it is self-evident that any air introduced into such a process will cause a corresponding increase in the volume of nitrogen present, and a concomitant dilution of the volumetric heating value of the pyrolytic gases produced. Moreover, the injection of air low in the bed generates high-temperature oxygen compounds, which react with the pyrolytic oil vapors and detrimentally alter the desirable chemical and physical properties of the ultimate oil product.

Accordingly, it is a primary object of the present invention to provide a novel process and system for continuously pyrolyzing an organic material to produce a gaseous product, a pyrolytic oil product, and a solid carbonaceous residue product having a predetermined volatiles content.

It is a more specific object of the invention to provide such a process and system by which a residue product having desirable specified levels of volatile fractions can be produced.

It is a further specific object to provide such a process and system for producing a gaseous product of undiluted volumetric heating capacity, and an oil product of physical and chemical properties which are substantially unadulterated by alien oxygen compounds and/or thermal degradation.

Yet another object of the invention is to provide a process and system of the foregoing nature in which the product gas is sufficiently cleansed of condensible organic vapors and solid particulate that it can be continuously reheated and recycled to the reactor without fouling of the system.

A still further object of the invention is to provide a process and system of the foregoing nature in which the pyrolytic gas produced can be recycled and used to dry and heat the organic feed material to its self-decomposition temperature, to control the temperature of solid residue so as to produce therein a predetermined desired volatility level, to recover thermal energy from the solid residue product to cool it and to afford optional thermal efficiency, and to provide an essentially one-dimensional conversion process for facile control of product variables.

A further object of the invention is to provide a novel process and system having such features and advantages, which are also energy-efficient, convenient and relatively simple and inexpensive to carry out and to use.

An additional specific object of the invention is to provide a method for processing organic material which tends, when heated, to agglomerate or form a tacky mass of low permeability, to produce a solid carbonaceous residue product, an oil product and a gaseous product.

SUMMARY OF THE INVENTION

It has now been found that certain of the foregoing and related objects of the present invention are readily attained in a continuous process in which a vertically moving packed bed of a pyrolyzable organic material is established and maintained, by continuously introducing a feed of such material to the top portion of the bed and removing the solid residue from the bottom portion thereof. A temperature gradient is established through the depth of said bed, with a maximum value of about 800° to 1400° Fahrenheit at an intermediate level, for pyrolysis of the material to a carbonaceous residue and a gaseous mixture. The gases are withdrawn from the top portion of the bed as an offgas stream including a noncondensible fraction and a condensible fraction comprised of organic vapors and water vapor; the stream is treated to remove substantially all entrained solid particulate and condensible fractions, to provide a cleansed gas. A first portion of the cleansed gas is recycled and upwardly drafted through the bed for energy recovery; it is introduced into the bed at a temperature substantially below the specified maximum temperature value, and at a "lower" level disposed below the "intermediate" level thereof, between which levels an energy recovery zone is thereby defined. The mass flow rate of the recovery gas and the depth of the energy recovery zone are so maintained that the recovery gas will be heated substantially to such maximum temperature value at the point of its entry to the intermediate bed level. A second portion of the cleansed gas is similarly recycled and upwardly drafted through the bed for thermal treatment of the feed material; it is introduced into the bed substantially at the intermediate level thereof, and at a mass flow rate and a temperature which are adequate (in cooperation with the energy-recovery gas) to heat the material to its maximum temperature value. Finally, a third portion of the cleansed gas is recycled and upwardly drafted through the bed for drying and preheating of the feed, which portion is introduced at a level above the intermediate level and below the level of feed introduction, thereby defining therewith pyrolysis and drying/preheating zones, respectively. The depth of the pyrolysis zone is such that adequate pyrolysis of the feed material will occur, and the temperature and volumetric flow rate of the drying/preheating gas, coupled with the depth of the drying/preheating zone, are such as to ensure adequate drying and preheating of the feed material (in cooperation with the energy recovery gas and the thermal-treatment gas), and to therewith maintain the offgas stream at a temperature between the temperatures at which the energy-recovery and drying/preheating gases are introduced into the bed.

In preferred embodiments of the process, the feed will comprise predried particulate organic material having a moisture content of about 3 to 30 percent, based upon the wet weight thereof, and most desirably it will comprise a wood residue predried to a moisture content of about 5 to 25 percent. Normally, a feed material with a bulk density of about 15 pounds per cubic foot will be introduced into the bed at a rate of about 100 to 200 pounds per hour (based upon the dry weight thereof) per square foot of bed cross-sectional area.

The thermal-energy recovery gas will preferably be introduced into the bed at a temperature of about 185° to 210° Fahrenheit, with the temperature of the residue being reduced by contact therewith to a value about 25 to 100 Fahrenheit degrees thereabove. The drying/preheating gas will typically be introduced into the bed at a temperature of about 700° to 950° Fahrenheit, and the offgas stream will usually have a temperature of about 230° to 450° Fahrenheit. Generally, each portion of the cleansed gas will be introduced at a multiplicity of points disposed across the cross-section of the bed, to uniformly distribute the gas thereinto, with the drying/preheating gas normally being introduced at a plurality of levels within the drying/preheating zone of the bed, to accommodate the relatively large volumes thereof that are usually involved.

In especially desirable embodiments of the process, the "first" portion of the cleansed gas used for thermal energy recovery is employed without adjustment of its temperature, with the second and third portions thereof being heated to provide the thermal treatment and drying/preheating gases, respectively. The process will advantageously include an additional step of burning a fourth portion of the cleansed gas to provide hot combustion gases, the second and third portions of the cleansed gas being heated by thermal contact therewith.

The process may also beneficially include a step of predrying a relatively moist feedstock to provide the feed material (typically with drying gases at a temperature of about 450° to 850° Fahrenheit), by passing the feedstock through a hot-gas dryer in which at least a portion of the volume of hot gases required are furnished by the combustion gases produced in the burning step. In such a case, at least a portion of the volume of combustion gases furnished to the dryer may previously have been subjected to thermal contact with the second and third portions of the cleansed gas, for the necessary heating thereof. A fifth portion of the cleansed gas may desirably be withdrawn as product gas.

Cleansing of the offgas stream can effectively be accomplished by a condensing and demisting operation, and a subsequent water condensation step, with the water used to effect condensation in the former operation desirably being supplied from the latter step. Normally, the contaminated pyrolytic oil condensed from the offgas stream will be filtered to remove solid particles therefrom, thereby providing a filter cake and a pyrolytic oil product, and generally the contaminated pyrolytic oil will be hydrated prior to filtration (to adjust its moisture content to about 12 to 20 percent, based upon the wet weight thereof), preferably using water which has been condensed from the offgas stream.

A portion of the pyrolytic oil product may be recycled to the ducting through which the offgases initially pass, and used solely to wash the walls thereof, to thereby minimize the buildup of solid condensates thereon. The contaminated pyrolytic oil from the wall washing operation will conveniently be combined with the contaminated pyrolytic oil condensed from the offgas stream, and filtered therewith, and some of the filtered oil may be cooled and combined with the contaminated oil streams prior to filtration, to lower the bulk temperature of the mixture. A portion of the pyrolytic oil product may, of course, be removed from the process, generally at a temperature of about 125° to 150° Fahrenheit.

It will usually be desirable to recycle the filter cake from the filtration operation to the bed for thermal treatment therein, and generally the filter cake will be blended with the feed material for introduction to the top of the bed. The solid residue product will desirably have a volatiles content of up to about 20 weight percent (plus or minus about 2 percent and as can be determined in accordance with ASTM test method D1762), based upon the weight of the residue, and will be substantially dry; generally, it will be removed at a temperature of about 220° to 280° Fahrenheit. Preferably, the maximum bed temperature will be maintained at less than about 1400° Fahrenheit, with the offgas temperature held at about 250° to 400°, to produce a solid residue with a volatiles content above about one percent. Most desirably, the maximum bed temperature will be about 825° to 1200° Fahrenheit, the offgas temperature will be about 275° to 350° Fahrenheit, to produce a solid residue with a volatiles content above about six percent. It should be be understood that, as used herein, the expression of volatility content is exclusive of any water or water vapor present, and is based upon the weight of the associated solid residue alone.

Other objects of the invention are attained in a system including a vertical shaft reactor adapted for continuously effecting the pyrolysis of a organic feed as a descending packed bed. The reactor will have inlets at sequentially downwardly spaced locations for feed, drying/preheating gas, thermal-treatment gas and thermal-energy-recovery gas, and it will have outlets adjacent the top and bottom thereof for offgases and solid residue product, respectively. In addition, the system will include means for treating the offgases from the reactor to remove entrained solid particulate and condensible fractions; to provide a cleansed gas; means for recycling the cleansed gas to each of the drying/preheating gas, thermal-treatment gas and energy-recovery gas inlets of the reactor; and means for heating the gas prior to introduction through the inlets for drying/preheating gas and for treatment gas. The gas recycling means will generally comprise a blower to induce flow of offgases from the reactor and through the offgas treating means.

In preferred embodiments of the system, the gas heating means will comprise at least one heat exchanger for gas-to-gas thermal energy transfer, and will additionally include a burner for the cleansed gas, means for delivery of such gas to the burner, and means for delivery of hot combustion gases therefrom to the heat exchanger. Normally, such gas heating means will include a second such heat exchanger, together with means for delivery of combustion gas thereto, with one of the heat exchangers being independently associated with each of the drying/preheating gas and thermal-treatment gas inlets to the reactor. The system will desirably additionally include a dryer for feedstock, means for conveying feed from the dryer to the feed inlet of the reactor, and means for delivery of combustion gas to the dryer from the burner. In such event, the system may include means for delivery of combustion gas from the low temperature side of the heat exchanger(s) to the dryer, to thereby enable recovery of waste heat therefrom.

The offgas treating means will beneficially include a condenser/demister and a water condenser connected to the offgas outlet of the reactor for sequential flow of offgases therethrough, with the system additionally including associated reservoirs for receiving the pyrolytic oil and water that are removed therein as condensible offgas fractions. By connecting the water reservoir to the condenser/demister and to the oil reservoir, recovered internal water can be employed to effect condensation in the condenser/demister and to effect hydration of pyrolytic oil in the oil reservoir.

In addition, the system will normally include filter means and means for delivery thereto of contaminated oil containing the solid particulate matter condensed from the offgas stream, with means generally being provided for recycling filter cake from the filter means to the feed inlet of the reactor. The system will most advantageously include means for conveying and injecting oil received from the filter to and upon the interior wall surfaces of the ducting connecting the condenser/demister to the reactor offgas outlet, to thereby prevent the buildup of solid condensates thereupon, with gas/liquid heat exchange being minimized therein. As yet further features, means for thermal conditioning of the pyrolytic oil, a surge reservoir for oil received therefrom, and suitable connecting means, will desirably be incorporated into the system. Finally means for withdrawing product oil from the system will generally be provided.

On being heated in a vertical bed, some types of feed material, and in particular rubber tires, coal and similar organic materials, tend to agglomerate or to form a tacky mass, which becomes difficult or impossible to continuously process, unless appropriate measures are taken. The bed of material must of course be permeable, so that good gas-solid contact is achieved throughout, and it should be relatively free-flowing. While those conditions result once such materials have been pyrolyzed, problems in processing them do occur in the upper, relatively low-temperature regions of the bed. The condition can be improved somewhat by increasing gas temperatures and flow rates, but such expedients alone will usually be inadequate, as a practical matter.

In accordance with the present invention, it has been found that such problems can be significantly alleviated by incorporating into the feed about 10 to 75 percent, based upon the volume of the material that tends to agglomerate or amass, of solid, dimensionally stable particles. The volume of particles to be added in any particular case will depend upon the specific characteristics of the feed material. Relevant factors include, for example, whether any coal present is of a caking or non-caking variety, the form of any tires present (they will usually be shredded), the proportion of the total feed stream (e.g. of municipal solid waste) that is represented by the problem material, etc. In a typical case, the added solid particles will comprise about 50 volume percent of the agglomerating or amassing component of the feed.

Although the added particles can be of virtually any solid material that will maintain shape and a relatively dry, non-tacky state under the existing upper bed conditions (i.e., at temperatures below those at which substantial pyrolysis of the feed occurs), an excellent substance for blending with the feed will, in most instances, be provided by the solid carbonaceous residue product itself. Generally, a coarse fraction (e.g. about one-quarter inch or larger) can readily be screened from the solid output of the system, and returned for that purpose to the input feed screw. Ceramic saddles, rocks, and the like can also be employed, provided of course that they are sufficiently large to enable facile separation from the solid carbonaceous residue. Although the particles added will generally be of an inert material, it should be understood that substances that will ultimately pyrolyze during passage through the reactor (such as wood chips) can also be utilized, as long as they maintain their dimensional stability while in the upper bed regions, so as to provide the levels of mobility and permeability required therein. Finally, it should be appreciated that no significant net thermal loss will occur as a result of the practice here described, since even the inert particles will be both heated and cooled within the reactor during transit from the top to the bottom.

DETAILED DESCRIPTION OF THE ILLUSTRATED AND PREFERRED EMBODIMENTS

Figure 1:
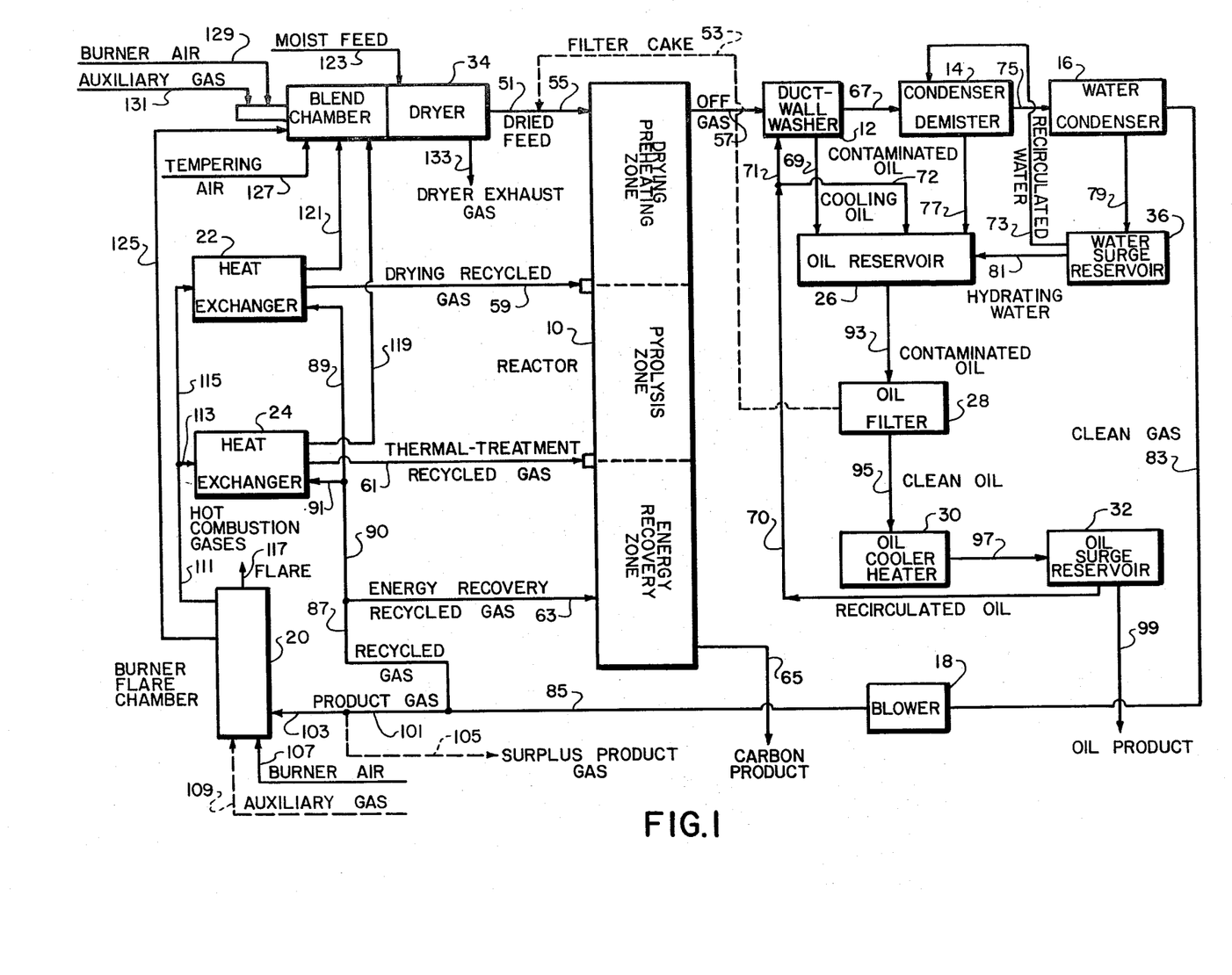
FIG. 1 is a schematic representation of a system embodying the present invention, and adapted for the practice of the several embodiments of the process thereof.

Turning now in detail to the appended drawing, therein illustrated is a system embodying the present invention and comprised of a vertical shaft, moving bed-type of pyrolysis reactor, generally designated by the numeral 10, a duct-wall washer 12, a condenser/demister 14, a water condenser 16, a blower 18, a burner/flare chamber 20, a drying gas heat exchanger 22, a thermal-treatment-gas heat exchanger 24, an oil reservoir 26, an oil filter 28, an oil cooler/heater 30, an oil surge reservoir 32, a dryer 34, and a water surge reservoir 36. The system also includes appropriate conduits and lines to connect the several units of the system in an appropriate manner, as will be discussed in detail hereinbelow. In general, however, it might be pointed out here that various of the lines and conduits will be insulated to prevent thermal energy losses, and the suitable valves and control mechanisms will also be provided, although not specifically illustrated.

The reactor itself may be constructed in much the same manner as that which is illustrated and described in the previously identified U.S. Pat. No. 4,230,602 to Bowen and Purdy (especially FIG. 2 thereof), the relevant portions of which are therefore hereby incorporated by reference thereto. Suffice to say in addition that the reactor may advantageously be of a double-walled stainless steel construction, backed by a low-thermal-conductivity material to provide thorough insulation. As shown, appropriate input and output metering devices for the feed and solid residue product, internal leveling and bed-depth control means, and suitable safety valves and temperature sensing devices will be included, if so desired.

By virtue of the feed and the several gas-input locations, and the carbon product output location, three zones are defined within the reactor 10; namely, a drying and preheating zone adjacent the top of the reactor, an intermediate pyrolysis zone therebelow, and an energy recovery zone in the lower portion of the shaft. The zones and the manner in which they are defined will be discussed in considerable detail subsequently, but it will be appreciated, in any event, that the boundaries between them will tend to be indistinct and transitory, despite possible inferences that might be drawn from the schematic representation of FIG. 1.

The feedstock, which will generally be a mixture of predried particulate feed and filter cake recovered from the process, is introduced into the reactor 10 through line 55 (advantageously comprising a mixing screw conveyor), and is deposited upon the upper surface of the bed established therewithin. As indicated previously, a leveling device will normally be provided to achieve uniform distribution of the fresh feed material, and the introduction thereof may be controlled by an automatic bed depth sensing and feed activation system. During its descent through the drying/preheating zone, the feedstock will encounter the relatively hot gases and vapors that flow upwardly therethrough, and will be heated by thermal energy transfer from the gaseous phase, to drive off residual moisture and to elevate the temperature of the feedstock ultimately to its decomposition point. The lower boundary of the drying/preheating zone is defined at the level at which recycled drying gas is introduced through line 59. The recycled gases will generally be introduced into the bed through a manifold that is fitted with suitable ducts that span the reactor shaft and distribute the gas uniformly across its cross-section, which ducts will be so configured and spaced as to facilitate passage of the solid material therebetween and unimpeded continuous movement of the bed. Also, the gas-jet nozzles from the ducts will desirably be downwardly directed to minimize clogging of the openings thereof by the bed material, and to achieve most efficient diffusion of the gases through the bed. It should be understood that such a gas distribution structure will advantageously be used at all locations at which gas is introduced into the bed of material.

The temperature and mass flow rate of the drying gas introduced through line 59 will advantageously be so controlled as to substantially match the temperature of the stream of gases and vapors flowing upwardly from the lower zones of the bed. This will establish a monotonic increase in the bed temperature relative to its depth through the pyrolysis zone, and will also ensure that a desired preselected temperature is established in the offgas stream flowing through line 57. Normal variations in feedstock moisture content are easily corrected for by adjusting the mass flow rate of the drying gas in such a manner as to maintain a constant temperature in the offgas stream, thus readily permitting accurate control of the initial thermal processing of the feedstock, to the extent that it occurs within the reactor 10.

Upon exiting from the drying/preheating zone, the solid material passes into the pyrolysis zone defined therebeneath, in which the feedstock decomposes to yield pyrolytic gases and vapors, and a solid residue. The gases and vapors generated join the gaseous streams flowing upwardly from the underlying energy recovery zone, and are ultimately drafted from the reactor, together with the recycled drying gas and evaporated water and organic fractions, as the offgas stream 57.

The volatile content of the solid residue is very accurately controlled by controlling the maximum temperature to which it is heated in the pyrolysis zone. This is, in turn, determined by the temperature of the recycled thermal treatment gas, which is introduced into the bed through line 61 using a second manifold of suitable structure and configuration for distribution of the gas across the bed, as has been previously described. The char temperature is elevated nearly to that of the thermal treatment gas by the provision of sufficient residence time in the pyrolysis zone, which is of course a function of the depth of the zone and the overall rate of throughput established in the reactor. As will be appreciated, the pyrolysis zone is defined generally between the levels of drying gas and thermal treatment gas introduction at lines 59 and 61, respectively, and its depth may be controlled by suitable selection of those levels; throughput will be controlled by adjustment of the speed at which the solid residue discharge mechanism for the reactor is operated.

It should be appreciated that the mass flow rate of the thermal treatment gas will not affect the nature of the solid carbon product to any substantial extent. However, it will very significantly influence the temperature and mass flow rate of the drying gas stream, and thereby the thermal environment of the pyrolytic gases and vapors produced. While there is a considerable degree of freedom that can be exercised in the selection of the mass flow rate of the treatment gas stream, control will be substantially simplified by setting it at a value approximately equal to that of the energy recovery gas stream (to be discussed hereinafter), which may be kept essentially constant over the full range of operating conditions; thus, it is possible to essentially fix two of the three recycled gas stream flow rates, quite independently of the nature of the solid product to be produced.

The locations of introduction of thermal treatment gas (line 61) and energy recovery gas (line 63) define, respectively, the upper and lower limits of the energy recovery zone. The solid char residue passes directly from the pyrolysis zone into the energy recovery zone, wherein a substantial portion of its thermal energy is absorbed and transported by the recovery gas to the upper bed zones, thereby providing part of the energy demands for the processes taking place therein. Whereas the line 63 will normally supply a manifold fitted with suitable shaft-spanning gas distribution ducts of the sort previously described, when the mechanism used to support the bed and meter the outfeed of carbon products is of appropriate design, the energy recovery gas may be recycled directly into the plenum (not illustrated) at the bottom of the shaft, in which the solid product is received.

The temperature at which the energy recovery gas is introduced into the bed will generally be that at which it is received from the gas cleansing operations, which are to be described in detail hereinbelow. Taking that temperature into consideration, the mass flow rate of the energy recovery gas stream will normally be regulated so as to cool the carbon residue product to a temperature that is about 25 to 100 Fahrenheit degrees above the temperature of the recovery gas, as it is introduced into the reactor. By proper dimensioning of the energy recovery zone (essentially by establishing an appropriate distance between the levels of thermal treatment gas and energy recovery gas) the temperature to which the energy recovery gas will be heated when it reaches the level of thermal treatment gas introduction will be approximately the same as that of the carbon product at the same location. As a result, the solid residue will then be practically in thermal equilibrium with the prevailing gaseous environment, thereby permitting very accurate steady state control of the volatility of the carbon product, in an energy efficient manner.

Although not shown, but as previously indicated, a volumetric, solid product metering device is provided at the base of the shaft of the reactor 10, both to support the bed thereabove and also to uniformly remove the product and discharge it into a collection chamber, generally comprising a hopper or plenum. The product is collected and transported therefrom, such as by a screw conveyor, and discharged through a rotary valve in line 65.

Thus, to summarize the gas flow scheme through the reactor 10, the energy recovery gas introduced through line 63 is drafted upwardly through the bed, and is heated to essentially the maximum bed temperature prior to reaching the level at which the thermal treatment gas is introduced through line 61, in turn cooling the carbon product and recovering a substantial portion of its thermal energy. The combined energy recovery and thermal treatment gas streams will attain a temperature slightly in excess of the maximum bed temperature being maintained in the pyrolysis zone, and will therefore supply the energy required for pyrolyzing the feed and for elevating the temperature of the resulting solid residue to the specified maximum value, the temperature of the combined gas stream being reduced corrspondingly during passage through that zone. As the decomposition proceeds, the pyrolytic gases and vapors mix with the gases of the two streams introduced below the pyrolysis or thermal treatment zone, and the mixture of gases will attain substantially the temperature at which the drying gas is introduced at the point that they join that incoming stream. Consequently, the streams mix essentially isothermally, thereby ensuring that the temperature of the gas stream monotonically increases in relationship to the depth of the bed down to the level of treatment gas injection. As previously indicated, the combined stream that exists above the point of recycle of the drying gas serves as the heating medium for drying and preheating the feed material.

The offgas stream passes from the reactor 10 through line 57, which comprises a part of the duct-wall washer 12, by which the reactor 10 is connected to the condenser/demister 14. The wall washer 12 serves to avoid fouling of the connecting duct with condensible fractions of the offgas stream and solid particulate entrained therein, such as would seriously curtail or prohibit continuous operation of the system. The duct walls are washed with pyrolytic oil recovered in the process and introduced through line 71, the effectiveness of which is enhanced by the fact that the oil inherently contains fractions that serve as a natural solvent for the materials that tend to condense and/or deposit upon (and thereby foul) the relatively cool walls of the ductwork leading from the reactor; thus, particulate is suspended and soluble matter is dissolved in the oil. It is to be noted that the recycled oil is applied to the walls of the duct in such a manner as to minimize thermal contact with the offgas stream, so as to avoid any undue alteration of its chemical or physical properties, as is important from the standpoint of maximizing the value of the oil as a chemical feedstock. Consequently, there will be little thermal energy transfer beetweeen the offgases and the oil, with the former entering the condenser/demister 14 at a temperature only slightly less than that at which it exited from the reactor 10, and with the washing oil exiting from the washer 12 through line 69 at a temperature which is only slightly higher than that at which it was introduced through line 71.

The offgases then enter the condenser/demister through line 67, and are treated therein with a mist of hot water supplied through line 73. The water lowers the temperature of the offgases by evaporative cooling, and is supplied at such a mass flow rate that it will be entirely evaporated; the oil vapors and some of the water vapor present in the offgas stream will therefore condense, thus producing a pyrolytic oil having a controlled moisture content. For this purpose, it will, of course, be necessary that excellent gas/vapor/liquid/solid contact be achieved in the mechanical separator portion of the unit 14. The contaminated oil stream and the partially cleansed gas stream leave the condenser/demister 14 at substantially the same temperature, with the contaminated oil passing therefrom through the line 77.

The volumes of pyrolytic oil withdrawn through lines 69 and 77 from the duct-wall washer 12 and the condenser/demister 14, respectively, are fed (normally gravitationally) into an oil reservoir 26, but the oil in line 69 could obviously be passed directly to the condenser/demister 14, the total to be removed through line 77. In any event, it will generally be advisable to provide a rotary valve in each of the lines 69, 77, to isolate the oil reservoir 26 from the units with which they are associated. Subsequent treatment and use of the oil will be discussed hereinafter.

From the condenser/demister 14, the gas stream next passes through line 75 into the condenser 16 (typically a water-cooled shell-and-tube type heat exchanger), to thereby produce a clean gas, which is drafted by the blower 18 through line 83 for supply to other parts of the system. The thus condensed water is utilized not only to provide the evaporative cooling water mist in the condenser/demister 14, but also to provide water for hydration of the oil recovered in the process. It exits from the condenser 16 through line 79, and is collected in a water surge reservoir 36. A suitable portion thereof is taken to the condenser/demister 14 through the recirculation line 73, and a second portion is transported through line 81 to the oil reservoir 26, where it is mixed with the pyrolytic oil collected therein. Recycling of the collected water in this manner affords a three-fold benefit: firstly, the internal process water requirements are met without need for any external water supply; secondly, no waste water stream is produced, since the volume of water condensed is limited to that which is required in the process; and thirdly, any light organic vapors that may not have been removed from the offgas stream in its passage through the condenser/demister will tend to be removed with the water condensate, to be recycled into the oil and offgas streams and thereby utilized innocuously and to greatest advantage.

Operation of the water condenser is controlled by varying the coolant flow rate in such a manner as to maintain the level of the water in the surge reservoir 36 at an essentially constant level, and apportionment of the gas stream cooling effects between the condenser/demister 14 and the water condenser 16 can readily be controlled by monitoring the organic content of the water flowing through line 73. More particularly, in regard to the latter control feature, if the concentration of organics in the recirculated water exceeds a predetermined set point value, additional cooling in the condenser/demister is indicated, and consequently the flow rate through line 73 is increased until the set point value of organic concentration is satisfied. Conversely, the flow rate is decreased if the organic fraction of the water is found to be deficient, with reference to the set point value. In practice, the temperature of the offgases leaving the condenser/demister 14 is maintained at a set point value, which is adjusted so as to yield the set point value of organic concentration, by varying the flow rate through line 73.

From the reservoir 26, the collected oil, admixed with any hydrating water supplied thereto, is conveyed to the oil filter 28 through line 93, to remove the particulate recovered in the duct-wall washer 12 and the condenser/demister 14 and contained therein; a suitable filtration system will constitute a sealed, rotary vacuum filter, which is sealed to avoid oxidative degradation of the oil and to prevent the escape of organic vapors to the environment. The clean oil passes from the filter 28 through line 95 into an oil cooler/heater 30, in which unit the temperature of the oil may conveniently be adjusted, as appropriate. Under steady-state operating conditions, the oil will generally be cooled to achieve a temperature at which it can be recirculated most efficiently; the unit 30 is typically a shell-and-tube heat exchanger in which the thermal transfer medium is water. The oil from the cooler/heater 30 is conveyed to an insulated oil surge reservoir 32, from which a portion will be pumped through to the duct-wall washer 12 and the oil reservoir 26, through branches 71 and 72, respectively, of the line 70. The lines 70, 71 and 72 will be heat-traced, and the latter two will, together with line 97, be fitted with mass-flow rate detectors so as to permit monitoring and control of the streams flowing through them. An oil level detector will be provided in the oil surge reservoir 32 to control the rate at which product oil is pumped therefrom and delivered to storage through line 99, which generally will also be fitted with a mass-flow rate detector to enable the total mass of pyrolytic oil produced and flowing in the system to be monitored.

It should be appreciated that the amount of oil provided to the reservoir 26 through the several inlets thereto, taken with the amount of water provided through line 81, will be such as to achieve a mixed-mean temperature at which filtration will be reliable and the moisture content of the oil will be maintained. The suspension of particulate matter therein will be maintained by a suitable stirring device. Also, it is a good practice to produce the oil in the condenser/demister 14 with a moisture content slightly less than that which is desired in the product passing through line 93, so that precise control may be achieved by the addition of hot hydrating water through line 81.

The particulate recovered in the oil filter 28 forms a filter cake with the pyrolytic oil in a liquid:solids ratio ranging from about 1:1 to 9:1. The filter cake is conveyed through line 53 from the filter 28 to the feed mixing screw of the reactor 10 at 55, wherein it is mixed with the predried feedstock furnished through line 51; typically, the filter cake will constitute only a minor proportion of the weight of feed material introduced into the reactor.

The pressurized gas stream exiting from the blower 18 through line 85 is divided into a product gas stream, flowing in line 101, and a recycled gas stream, flowing in line 87. Although under typical operating conditions the entire volume of gas produced will often be consumed internally in the process, there are circumstances under which salable surplus gas product may be produced; line 105 is provided to withdraw that portion of the gas from the system. Any such surplus may, of course, be recovered for on-site use, either to produce thermal or mechanical/electrical energy (e.g., in an internal combustion engine), which energy resources may be utilized in the process or elsewhere.

In the usual case, however, the total volume of product gas generated in the process, and not recycled thereto, will be supplied to the burner/flare chamber 20 through line 103, where it will be burned with combustion air introduced through line 107 to form products of combustion at a given temperature, most desirably in the range of about 1800° to 2200° Fahrenheit. Moreover, when the quantity of product gas is insufficient to produce the necessary volume of combustion products at an appropriate temperature, a supplemental or auxiliary gas will be introduced through line 109. Burning will, of course, be conducted in such a manner as to ensure that all applicable gas emission standards are complied with, to which end excess combustion air will invariably be provided to the burner 20.

The combustion products exit from the burner/flare chamber 20 as three streams. A first stream flows to the two heat exchangers 22, 24 through line 111 and branch lines 115, 113 respectively; a second stream flows through line 125 to the blend chamber of the dryer 34; and the third flows through the flare stack 117 for discharge of excess gases to the atmosphere, the latter normally being utilized primarily during periods of transient operation of the system. It will be appreciated that, rather than providing a single burner 20, separate combustion chambers fueled by product gas from line 103 could be provided for each of the heating operations of the system.

In addition to providing the source of the hot combustion gases, a large proportion of the gas flowing through line 85 is utilized for recycle to the reactor, providing each of the drying gas, thermal treatment gas and energy recovery gas volumes referred to in some detail hereinabove; this, of course, is a fundamental feature of the invention. All of the recycle gas flows initially through main line 87. Part of it is conveyed therefrom through line 63 to provide the relatively low-temperature energy recovery gas furnished to the base of the reactor 10, a mass-flow rate detector and a flow damper being provided therein to permit accurate control of the flow. The remainder of the gas withdrawn through line 87 flows through connecting line 90, which is joined to the two heat exchangers 22, 24, by the branch lines 89, 91, respectively. These branch lines are also fitted with mass-flow rate detectors and flow dampers to permit appropriate control of the gas flow rates entering their associated heat exchangers.

The recycled drying gas flowing through the heat exchanger 22, via lines 89 and 59, is heated to its bed-introduction temperature by thermal transfer with the hot combustion gas flowing through line 115; normally, this will be about 700° to 950° Fahrenheit, with a preferred upper limit of 850°. Similarly, the thermal treatment gas flowing through the heat exchanger 24, via lines 61 and 91, is heated to its proper temperature by thermal exchange with the combustion gases flowing through line 113, which temperature will, as previously indicated, be slightly in excess of the maximum to which the solid residue is to be heated.

As will be noted, the combustion gases exit from the two heat exchangers through lines 121 and 119, and those streams are introduced into the blend chamber of the dryer 34, together with the primary heating gas passing through line 125 directly from the burner 20, as well as with such volume of tempering ambient air as may be appropriate, which is furnished through line 127. Gas flow dampers are provided in each of the lines 119, 121 and 125 to enable close control of the temperatures to which the various associated gas streams are to be heated, and to effect a suitable balance therebetween. The ambient tempering air drawn into the gas blend chamber of the dryer 34 serves to moderate the bulk temperature of the resulting gas mixture and to provide a proper inlet temperature for the drying operation; generally, this temperature will be less than about 800° Fahrenheit, so as to produce conditions under which the dryer exhaust products will comply with applicable standards for gas emission purity. In those instances in which the energy content of the product gas stream is not adequate to heat the recycled gas streams while also supplying sufficient thermal energy for the required predrying processes, auxiliary gas will be supplied to a booster burner of the dryer 34 through line 131, with the requisite combustion air being furnished thereto through line 129. Operation of the booster burner will be controlled in response to the temperature detected in the dryer exhaust gas stream, which is discharged to the atmosphere through line 133; flow of the various streams through the dryer can readily be established by use of an induced-draft fan provided in the same exhaust line.

Exemplary of the efficacy of the present invention are the following specific Examples.

EXAMPLES 1 & 2

Green, chipped forest-harvesting residue, containing about 50 percent moisture on a wet basis, is fed to the dryer in a system of the sort illustrated in FIG. 1 of the drawing, and dried to moisture contents of about 10 and 23 percent (wet basis) for Examples 1 and 2, respectively. This predried feedstock is introduced into the reactor at the constant rate of 7000 ovendry pounds per hour, requiring a steady-state greed feed rate to the dryer of about 14,000 pounds per hour. The carbon product is to have a very low volatility, thereby requiring that the feedstock be heated to about 1400° Fahrenheit in the reactor, in turn setting the temperature of the thermal treatment gas recycled for pyrolysis at about the same value, which is independent of the initial moisture content of the predried feedstock.

The overall height of the bed within the reactor is about 10.5 feet, and its cross-sectional area is about 40 square feet; the depths of the drying/preheating zone, pyrolysis (thermal treatment) zone and energy recovery zone are about 3.5, 3 and 4 feet, respectively. Carrying out the process under the conditions set forth in Table I below produces solid residue products having essentially no volatile content. In the Table, the indicated stream numbers correspond to the numbering of FIG. 1 of the drawing, temperatures are expressed in Fahrenheit degrees, and mass flow rates are in pounds per hour.

TABLE I

| Stream Number | Substance | Temperature | | Mass Flow Rate | |
|---|---|---|---|---|---|
| | | Ex. 1 | Ex. 2 | Ex. 1 | Ex. 2 |
| 123 | GREEN FEED | 60 | 60 | 14,000 | 14,000 |
| | Dry Feed | | | 7,000 | 7,000 |

TABLE I-continued

| Stream Number | Substance | Temperature Ex. 1 | Temperature Ex. 2 | Mass Flow Rate Ex. 1 | Mass Flow Rate Ex. 2 |
|---|---|---|---|---|---|
|  | Moisture |  |  | 7,000 | 7,000 |
| 51 | Dried Feed | 60 | 60 | 7,778 | 9,100 |
|  | Dry Feed |  |  | 7,000 | 7,000 |
|  | Moisture |  |  | 778 | 2,100 |
| 53 | Filter Cake | 60 | 60 | 88 | 88 |
|  | Dry Solids |  |  | 35 | 35 |
|  | Dry Oil |  |  | 45 | 45 |
|  | Moisture |  |  | 8 | 8 |
| 55 | Reactor Feed | 60 | 60 | 7,866 | 9,188 |
| 63 | Recycled Recovery Gas | 191 | 196 | 1,471 | 1,429 |
| 61 | Recycled Treatment Gas | 1,400 | 1,400 | 1,464 | 1,447 |
| 59 | Recycled Drying Gas | 830 | 830 | 524 | 7,137 |
| 65 | CARBON PRODUCT | 241 | 246 | 1,917 | 1,917 |
| 57 | Offgas Stream | 300 | 300 | 9,408 | 17,284 |
| 71 | Duct-Wall Washing Oil | 100 | 100 | 4,178 | 5,240 |
| 67 | Offgas Stream | 295 | 295 | 9,406 | 17,282 |
| 69 | Contaminated Washing Oil | 106 | 109 | 4,180 | 5,242 |
| 73 | Evaporative Cooling Water | 191 | 196 | 995 | 1,124 |
| 77 | Contaminated Oil | 193 | 198 | 1,615 | 1,615 |
| 75 | Humidified Gas | 193 | 198 | 8,786 | 16,791 |
| 79 | Condensed Water | 191 | 196 | 995 | 1,124 |
| 83 | Clean Gas | 191 | 196 | 7,791 | 15,667 |
| 81 | Hydrating Water | 191 | 196 | 0 | 0 |
| 101 | Product Gas | 191 | 196 | 4,332 | 5,654 |
| 87 | Recycled Gas | 191 | 196 | 3,459 | 10,013 |
| 90 | Recycled Gas | 191 | 196 | 1,988 | 8,584 |
| 91 | Recycled Gas | 191 | 196 | 1,464 | 1,447 |
| 89 | Recycled Gas | 191 | 196 | 524 | 7,137 |
| 103 | Burner Gas | 191 | 196 | 4,011 | 4,976 |
| 105 | GAS PRODUCT | 191 | 196 | 321 | 681 |
| 107 | Burner Air | 60 | 60 | 15,076 | 12,184 |
| 109 | Auxiliary Gas | 60 | 60 | 0 | 0 |
| 111 | Combustion Products | 2,000 | 2,000 | 2,871 | 7,924 |
| 117 | Flare | 2,000 | 2,000 | 0 | 0 |
| 125 | Combustion Products | 2,000 | 2,000 | 16,216 | 9,233 |
| 113 | Combustion Products | 2,000 | 2,000 | 2,440 | 2,305 |
| 115 | Combustion Products | 2,000 | 2,000 | 431 | 5,619 |
| 119 | Combustion Products | 1,000 | 1,000 | 2,440 | 2,305 |
| 121 | Combustion Products | 1,000 | 1,000 | 431 | 5,619 |
| 127 | Ambient Tempering Air | 60 | 60 | 41,703 | 28,615 |
| 131 | Auxiliary Gas | 60 | 60 | 0 | 0 |
| 129 | Burner Air | 60 | 60 | 0 | 0 |
| 123 | Moist Feed | 60 | 60 | 14,000 | 14,000 |
| 51 | Dried Feed | 195 | 171 | 7,778 | 9,100 |
| 133 | Dryer Exhaust Gas | 215 | 191 | 67,012 | 50,672 |
| 70 | Recirculated Oil | 100 | 100 | 4,178 | 5,240 |
| 72 | Cooling Oil | 100 | 100 | 0 | 0 |
| 93 | Contaminated Oil | 130 | 130 | 5,795 | 6,857 |
| 53 | Filter Cake | 130 | 130 | 88 | 88 |
| 95 | Clean Oil | 130 | 130 | 5,707 | 6,769 |
| 97 | Cooled Clean Oil | 100 | 100 | 5,707 | 6,769 |
| 99 | OIL PRODUCT | 100 | 100 | 1,529 | 1,529 |

It is to be noted that the mass flow rate of the thermal treatment gas stream may theoretically be set at any value in the range of about 70 to about 1,750 pounds mass per hour. Since, however, the temperature of the drying/preheating gas is to be about the same as that of the upward flowing gases and vapors at the point that they join one another, setting the flow rate of the thermal treatment stream sets the temperature of the drying gas, taking into account practical flow rates for the latter. For example, relatively low thermal treatment gas flow rates call for relatively high drying gas flow rates with temperatures near 700° Fahrenheit, whereas relatively high rates call for temperatures near 850°. In Examples 1 and 2, the mass flow rate of the treatment gas and energy recovery gas are about equal, thereby requiring a drying gas temperature of about 830° Fahrenheit in each case.

The offgas stream temperature of 300° assures stable operation of the reactor, and it is low enough to assure minimum thermal degradation of the pyrolytic oil. Operation at significantly higher temperatures serves no useful purpose, and is very energy inefficient. With an offgas stream temperature of 300° and a drying gas temperature of 830°, the mass flow rate of the drying gas stream must be that which will accommodate the upper bed thermal energy load. The effect of this factor is quite dramatic, in that the mass flow rate of the drying gas stream must be increased from 524 to 7,137 pounds per hour to accommodate the change from 10 to 23 percent moisture content feed in Examples 1 and 2, respectively, causing a doubling of the offgas stream velocity and volumetric flow rate. It should be noted that the product gas is energetic enough to: (1) meet the 2,000° combustion temperature with 86 and 58 percent excess air in Examples 1 and 2, respectively; (2) meet all of the combustion energy needs of the system; and (3) produce a surplus.

As will be appreciated, the principal variant between the two Examples lies in the amount of moisture contained the feed. With the system illustrated, the moisture content of the feed could, as a practical matter, be increased slowly from that of Example 1 to that of Example 2. By increasing the mass flow rate of the drying gas stream to maintain the offgas temperature at 300°, the carbon and oil products remain unaffected, and near steady state operating conditions are maintained. Since the total mass of recycled gas in the system is relatively small, such a significant change in operating states can be easily accomplished in less than one hour's time. It should thus be clear that normal variants in dried feed moisture content can readily be accommodated in the process and system of the invention.

EXAMPLES 3 & 4

The same feedstock, system and reactor configuration are used to carry out two additional examples, the significant difference from the foregoing being that the volatile content of the carbon product is to be about 21 percent, thereby requiring heating the feedstock to a maximum of about 800° Fahrenheit in the reactor. This sets the thermal treatment gas temperature at about the same value, without regard to the initial moisture content of the predried feedstock. As in the previous Examples, the carbon product is to be cooled to within 50 Fahrenheit degrees of the temperature of the energy recovery gas, similarly dictating the mass flow rate thereof. Temperature and mass flow rate data for Examples 3 and 4 are set forth in Table II, below.

TABLE II

| Stream Number | Subtance | Temperature Ex. 3 | Temperature Ex. 4 | Mass Flow Rate Ex. 3 | Mass Flow Rate Ex. 4 |
|---|---|---|---|---|---|
| 123 | GREEN FEED | 60 | 60 | 14,000 | 14,000 |
|  | Dry Feed |  |  | 7,000 | 7,000 |
|  | Moisture |  |  | 7,000 | 7,000 |
| 51 | Dried Feed | 60 | 60 | 7,778 | 9,100 |
|  | Dry Feed |  |  | 7,000 | 7,000 |
|  | Moisture |  |  | 778 | 2,100 |
| 53 | Filter Cake | 60 | 60 | 88 | 88 |
|  | Dry Solids |  |  | 35 | 35 |
|  | Dry Oil |  |  | 45 | 45 |
|  | Moisture |  |  | 8 | 8 |
| 55 | Reactor Feed | 60 | 60 | 7,866 | 9,188 |
| 63 | Recycled Recovery Gas | 200 | 204 | 1,645 | 1,580 |
| 61 | Recycled Treatment Gas | 800 | 800 | 1,672 | 1,628 |
| 59 | Recycled Drying Gas | 705 | 705 | 3,448 | 12,169 |
| 65 | CARBON PRODUCT | 250 | 254 | 2,428 | 2,428 |

TABLE II-continued

| Stream Number | Substance | Temperature Ex. 3 | Temperature Ex. 4 | Mass Flow Rate Ex. 3 | Mass Flow Rate Ex. 4 |
|---|---|---|---|---|---|
| 57 | Offgas Stream | 300 | 300 | 12,196 | 22,131 |
| 71 | Duct-Wall Washing Oil | 100 | 100 | 3,807 | 4,921 |
| 67 | Offgas Stream | 295 | 295 | 12,194 | 22,129 |
| 69 | Contaminated Washing Oil | 109 | 113 | 3,809 | 4,923 |
| 73 | Evaporative Cooling Water | 200 | 204 | 901 | 1,061 |
| 77 | Contaminated Oil | 203 | 206 | 1,137 | 1,137 |
| 75 | Humidified Gas | 203 | 206 | 11,958 | 22,053 |
| 79 | Condensed Water | 200 | 204 | 901 | 1,061 |
| 83 | Clean Gas | 200 | 204 | 11,057 | 20,992 |
| 81 | Hydrating Water | 200 | 204 | 0 | 0 |
| 101 | Product Gas | 200 | 204 | 4,292 | 5,615 |
| 87 | Recycled Gas | 200 | 204 | 6,765 | 15,377 |
| 90 | Recycled Gas | 200 | 204 | 5,120 | 13,797 |
| 91 | Recycled Gas | 200 | 204 | 1,672 | 1,628 |
| 89 | Recycled Gas | 200 | 204 | 3,448 | 12,169 |
| 103 | Burner Gas | 200 | 204 | 4,292 | 5,615 |
| 105 | GAS PRODUCT | 200 | 204 | 0 | 0 |
| 107 | Burner Air | 60 | 60 | 5,901 | 8,713 |
| 109 | Auxiliary Gas | 60 | 60 | 108 | 244 |
| 111 | Combustion Products | 2,000 | 2,000 | 2,973 | 7,831 |
| 117 | Flare | 2,000 | 2,000 | 0 | 0 |
| 125 | Combustion Products | 2,000 | 2,000 | 7,328 | 6,741 |
| 113 | Combustion Products | 2,000 | 2,000 | 1,093 | 1,084 |
| 115 | Combustion Products | 2,000 | 2,000 | 1,880 | 6,747 |
| 119 | Combustion Products | 1,000 | 1,000 | 1,093 | 1,084 |
| 121 | Combustion Products | 1,000 | 1,000 | 1,880 | 6,747 |
| 127 | Ambient Tempering Air | 60 | 60 | 44,210 | 27,866 |
| 131 | Auxiliary Gas | 60 | 60 | 217 | 79 |
| 129 | Burner Air | 60 | 60 | 4,479 | 1,632 |
| 123 | Moist Feed | 60 | 60 | 14,000 | 14,000 |
| 51 | Dried Feed | 191 | 167 | 7,778 | 9,100 |
| 133 | Dryer Exhaust Gas | 211 | 187 | 65,429 | 49,049 |
| 70 | Recirculated Oil | 100 | 100 | 3,807 | 4,921 |
| 72 | Cooling Oil | 100 | 100 | 0 | 0 |
| 93 | Contaminated Oil | 130 | 130 | 4,946 | 6,060 |
| 53 | Filter Cake | 130 | 130 | 88 | 88 |
| 95 | Clean Oil | 130 | 130 | 4,858 | 5,972 |
| 97 | Cooled Clean Oil | 100 | 100 | 4,858 | 5,972 |
| 99 | OIL PRODUCT | 100 | 100 | 1,051 | 1,051 |

Similar latitude exists in setting the mass flow rate of the thermal treatment gas (as in the foregoing Examples), except that in the present Examples the acceptable values lie in the range of about 1,260 to about 10,500 pounds per hour. The corresponding drying gas temperatures must be from about 700° to about 760°, with 705° proving most practical. It should be noted that in these Examples the product gas is neither energetic enough to satisfy the 2000° combustion product temperature requirement, nor to supply all of the combustion energy needs of the system. Thus, a minimum of 20 percent excess air is set for the burner/flare system, and an auxiliary gas burner/supply is used to achieve the necessary combustion product temperature. Since the thermal energy produced is still inadequate to meet the dryer demand, an auxiliary gas burner is used to supply the deficit.

It is to be appreciated that the need for auxiliary fuels is attributable to achievement of high volatile content in the carbon product and to the high moisture content of the feedstock; it does not reflect upon the inherent energy efficiency of the system. The total auxiliary fuel requirement is essentially the same for both Examples; i.e., about 324 pounds per hour. Taking it to be natural gas, this amounts to an auxiliary energy input rate equivalent to 12.8 percent of the higher heating value of the ovendry feedstock. Viewed from a different perspective, the higher heating value of the carbon and oil products is about 5.4 times that of the required auxiliary fuel. While the pyrolytic oil produced by the present process could provide the auxiliary fuel requirements of these Examples, its value as a chemical feedstock will generally militate against such use.

EXAMPLES 5 & 6

The same feedstock, reactor configuration and system are again used to carry out two further examples, the significant difference from the foregoing again being the volatile content of the carbon product; in these Examples it is about 10.5 percent, dictating a maximum feedstock temperature attained in the reactor of about 1135° Fahrenheit. The moisture content of the predried feedstock is 10 percent on a wet basis in both cases, the significant difference as between the two Examples being the mass flow rate of the thermal treatment gas, illustrating the effect thereof upon the temperature and mass flow rate required in the drying gas stream. The conditions of operation are set forth in Table III.

TABLE III

| Stream Number | Substance | Temperature Ex. 5 | Temperature Ex. 6 | Mass Flow Rate Ex. 5 | Mass Flow Rate Ex. 6 |
|---|---|---|---|---|---|
| 123 | GREEN FEED | 60 | 60 | 14,000 | 14,000 |
|  | Dry Feed |  |  | 7,000 | 7,000 |
|  | Moisture |  |  | 7,000 | 7,000 |
| 51 | Dried Feed | 60 | 60 | 7,778 | 7,778 |
|  | Dry Feed |  |  | 7,000 | 7,000 |
|  | Moisture |  |  | 778 | 778 |
| 53 | Filter Cake | 60 | 60 | 88 | 88 |
|  | Dry Solids |  |  | 35 | 35 |
|  | Dry Oil |  |  | 45 | 45 |
|  | Moisture |  |  | 8 | 8 |
| 55 | Reactor Feed | 60 | 60 | 7,866 | 7,866 |
| 63 | Recycled Recovery Gas | 194 | 194 | 1,584 | 1,584 |
| 61 | Recycled Treatment Gas | 1,135 | 1,135 | 613 | 2,504 |
| 59 | Recycled Drying Gas | 705 | 800 | 4,159 | 169 |
| 65 | CARBON PRODUCT | 244 | 244 | 2,143 | 2,143 |
| 57 | Offgas Stream | 300 | 300 | 12,076 | 9,976 |
| 71 | Duct-Wall Washing Oil | 100 | 100 | 4,168 | 3,989 |
| 67 | Offgas Stream | 295 | 295 | 12,074 | 9,974 |
| 69 | Contaminated Washing Oil | 108 | 107 | 4,170 | 3,991 |
| 73 | Evaporative Cooling Water | 194 | 194 | 1,019 | 935 |
| 77 | Contaminated Oil | 197 | 197 | 1,404 | 1,404 |
| 75 | Humidified Gas | 197 | 197 | 11,689 | 9,505 |
| 79 | Condensed Water | 194 | 194 | 1,019 | 935 |
| 83 | Clean Gas | 194 | 194 | 10,670 | 8,570 |
| 81 | Hydrating Water | 194 | 194 | 0 | 0 |
| 101 | Product Gas | 194 | 194 | 4,314 | 4,314 |
| 87 | Recycled Gas | 194 | 194 | 6,356 | 4,256 |
| 90 | Recycled Gas | 194 | 194 | 4,772 | 2,673 |
| 91 | Recycled Gas | 194 | 194 | 613 | 2,504 |
| 89 | Recycled Gas | 194 | 194 | 4,159 | 169 |
| 103 | Burner Gas | 194 | 194 | 4,314 | 4,314 |
| 105 | GAS PRODUCT | 194 | 194 | 0 | 0 |
| 107 | Burner Air | 60 | 60 | 9,864 | 9,864 |
| 109 | Auxiliary Gas | 60 | 60 | 0 | 0 |
| 111 | Combustion Products | 2,000 | 2,000 | 3,233 | 3,053 |
| 117 | Flare | 2,000 | 2,000 | 0 | 0 |
| 125 | Combustion Products | 2,000 | 2,000 | 10,945 | 11,125 |
| 113 | Combustion Products | 2,000 | 2,000 | 718 | 2,930 |
| 115 | Combustion Products | 2,000 | 2,000 | 2,516 | 123 |
| 119 | Combustion Products | 1,000 | 1,000 | 718 | 2,930 |
| 121 | Combustion Products | 1,000 | 1,000 | 2,516 | 123 |
| 127 | Ambient Tempering Air | 60 | 60 | 42,516 | 42,601 |
| 131 | Auxiliary Gas | 60 | 60 | 128 | 124 |
| 129 | Burner Air | 60 | 60 | 2,638 | 2,563 |
| 123 | Moist Feed | 60 | 60 | 14,000 | 14,000 |
| 51 | Dried Feed | 190 | 190 | 7,778 | 7,778 |
| 133 | Dryer Exhaust Gas | 210 | 210 | 65,682 | 65,688 |
| 70 | Recirculated Oil | 100 | 100 | 4,168 | 3,989 |
| 72 | Cooling Oil | 100 | 100 | 0 | 0 |
| 93 | Contaminated Oil | 130 | 130 | 5,574 | 5,395 |
| 53 | Filter Cake | 130 | 130 | 88 | 88 |
| 95 | Clean Oil | 130 | 130 | 5,486 | 5,307 |
| 97 | Cooled Clean Oil | 100 | 100 | 5,486 | 5,307 |

TABLE III-continued

| Stream Number | Substance | Temperature Ex. 5 | Temperature Ex. 6 | Mass Flow Rate Ex. 5 | Mass Flow Rate Ex. 6 |
|---|---|---|---|---|---|
| 99 | OIL PRODUCT | 100 | 100 | 1,318 | 1,318 |

The mass flow rates of the thermal treatment gas are chosen to produce extremes in the temperature and mass flow rate of the drying gas, the temperatures being 705° and 800°, respectively. Although feasible, operating near the upper extreme is not a preferred practice for two reasons: i.e., control of the offgas stream temperature by variation of the mass flow rate of the drying gas stream becomes ineffective, and the pyrolytic oil vapor is heated excessively, thereby making thermal degradation more likely. Balancing good control and minimal thermal degradation of the oil product while producing the desired the carbon product of Examples 5 and 6 would indicate a thermal treatment gas flow rate of 1,204 pounds per hour, with a drying gas stream flow rate and temperature of 2,689 pounds per hour and 740° Fahrenheit, respectively. Finally, it should be noted that the product gas is, in these Examples, energetic enough to support combustion at 2,000° with 58 percent excess air. Nevertheless, the total energy content of the combustion products remains inadequate to meet the needs of the system, and auxiliary gas is required for operation of the dryer.

As will be appreciated, unlike the prior art processes for producing solid carbon products having significant proportions of volatiles, the present process employs no air or other oxygen source. This not only avoids the dilutive and product-modifying effects initially referred to above, but it also greatly facilitates control of the process as well as product characteristics, thereby enabling consistent results to be achieved on a continuous, steady-state basis. Such results are not feasible using prior art techniques wherein, as mentioned above, air is furnished and adjusted in relation to practicable minimum values (i.e., those amounts which will produce the temperatures and will provide the oxygen necessary to sustain the pyrolysis reaction).

To this end, the reactor shaft will be substantially sealed to the atmosphere, and will generally operate under a slight negative pressure, thereby ensuring that air is admitted only in minimal amounts, and generally only as a result of leakage through imperfect seals. The specific features of the reactor and the peripheral system equipment are not critical to the invention, and will readily be evident to those skilled in the art, in light of the foregoing disclosure. However, it might be mentioned that, in overall dimensions, the height of the reactor will typically be from about 18 to 22 feet, and it will generally be of rectangular cross-section with rounded corners, with a width of 2 to 7 feet, preferably 4 to 6 feet, providing a cross-sectional area of about 4 to 100, and preferably 16 to 50 square feet. The reaction zones established within the bed may, of course, also vary in depth, typically being about 3 to 4 feet, 1.5 to 3 feet and 2 to 4 feet for the drying/preheating zone, the thermal treatment or pyrolysis zone, and the energy recovery zone, respectively.

Thus, it can be seen that the present invention provides a novel process and system for continuously pyrolyzing an organic material to produce a gaseous product, a pyrolytic oil product, and a solid carbonaceous residue product having a predetermined volatiles content, which may be at a specified minimum value. The process and system are capable of producing a gaseous product of undiluted volumetric heating capacity and an oil product of physical and chemical properties which are substantially unadulterated by alien oxygen compoumds and/or thermal degradation, and normally the product gas will be sufficiently cleansed of condensible organic vapors and solid particulate that it can be continuously reheated and recycled to the reactor without fouling of the system. The process and system are energy-efficient, convenient, and relatively simple and inexpensive to carry out and to use.

Having thus described the invention, what is claimed is:

1. In a continuous process for producing a solid carbonaceous residue of predetermined volatile content, a pyrolytic oil, and a gaseous product, from an organic material that self-decomposes at elevated temperatures to a solid carbonaceous residue and a gaseous mixture of condensible and noncondensible fractions, the steps comprising:

(a) establishing a vertically moving packed bed of said material, and maintaining said bed by substantially continuously introducing a feed of said material to the top portion thereof and removing said solid residue from the bottom portion thereof;

(b) determining a maximum temperature, in the range of about 800° to 1400° Fahrenheit, to which said material is to be heated in said bed, corresponding to the desired volatile content of said residue;

(c) establishing a temperature gradient through the depth of said bed, with said maximum temperature being maintained at an intermediate level, for pyrolysis of said material to said residue and gaseous mixture;

(d) withdrawing said gaseous mixture from said top portion of said bed as an offgas stream, including a noncondensible fraction and a condensible fraction comprised of organic vapors and water vapor, and treating said offgas stream to remove substantially all entrained solid particulate and condensible fractions therefrom, to provide a cleansed gas;

(e) recycling and upwardly drafting through said bed a first portion of said cleansed gas for energy recovery, said recovery gas being introduced into said bed at a lower level disposed below said intermediate level thereof, to define an energy recovery zone therebetween, and at a temperature substantially below said maximum temperature, the volumetric flow rate of said recovery gas and the depth of said energy recovery zone being so maintained that said recovery gas is heated substantially to said maximum temperature at entry to said intermediate bed level, and is at least substantially in thermal equilibrium with said material thereat;

(f) recycling and upwardly drafting through said bed a second portion of said cleansed gas for thermal treatment of said material, said treatment gas being introduced into said bed substantially at said intermediate level and substantially at said maximum temperature; and (g) recycling and upwardly drafting through said bed a third portion of said cleansed gas for drying and preheating said feed, said drying/preheating gas being introduced at a level above said intermediate level and below the level of feed introduction to define therewith pyrolysis and drying/preheating zones, respectively, and being at a temperature that is substantially the same as that of the upward flowing gases and vapors exiting from said pyrolysis zone, the depth of said pyrolysis zone being so maintained as to ensure adequate pyrolysis of said material, the temperature and volumetric flow rate of said drying/preheating gas and the depth of said drying/preheating zone being so maintained as to adequately dry and preheat said feed material to said self-decomposition point, prior to entry into said pyrolysis zone in cooperation with said recovery gas and said treatment gas, and to therewith maintain said offgas stream at a temperature between the temperatures at which said recovery and drying/preheating gases are introduced into said bed.

2. The process of claim 1 wherein said feed comprises predried particulate organic material having a moisture content of about 5 to 30 percent, based upon the wet weight thereof.

3. The process of claim 2 wherein said feed comprises wood residue predried to a moisture content of about 10 to 25 percent, based upon the wet weight thereof.

4. The process of claim 2 wherein said feed material is introduced to said bed at a rate of about 100 to 200 pounds per hour per square foot of bed cross-sectional area, based upon the dry weight thereof.

5. The process of claim 1 wherein said recovery gas is introduced into said bed at a temperature of about 185° to 210° Fahrenheit, wherein the temperature of said solid residue is reduced by contact therewith to a value about 25 to 100 Fahrenheit degrees thereabove, wherein said drying/preheating gas is introduced into said bed at a temperature of about 700° to 950° Fahrenheit, and wherein said offgas stream has a temperature of about 230° to 450° Fahrenheit.

6. The process of claim 1 wherein each of said recovery, treatment and drying/preheating gases is introduced at a multiplicity of points disposed across the cross-section of said bed, to uniformly distribute said gas thereinto.

7. The process of claim 6 wherein said drying/preheating is introduced at a plurality of levels within said drying/preheating zone of said bed.

8. The process of claim 1 wherein said first portion of said cleansed gas is employed without adjustment of its temperature to provide said recovery gas, and wherein said second and third portions thereof are heated to provide said treatment and drying/preheating gases, respectively, said second portion being heated to a temperature substantially above that of said third portion.

9. The process of claim 8 including the additional step of burning a fourth portion of said cleansed gas to provide hot combustion gases, said second and third portions of said cleansed gas being heated by thermal contact with said combustion gases to their introduction temperatures.

10. The process of claim 9 including an additional step of predrying a relatively moist feedstock, to provide said feed material, by passing said feedstock through a hot gas dryer, at least a portion of the volume of hot gases required in said dryer being furnished by said combustion gases from said burning step.

11. The process of claim 10 wherein said combustion gases furnished to said dryer are at least in part first used in said thermal contact with said second and third portions of said cleansed gas, and wherein said drying operation is effected with drying gases at a temperature of about 450° to 850° Fahrenheit.

12. The process of claim 1 wherein a fifth portion of said cleansed gas is withdrawn as product gas.

13. The process of claim 1 wherein said offgas stream is cleansed by a condensing and demisting operation, followed by a water condensation operation, the water used in said condensing/demisting operation being condensate obtained from said water condensation operation.

14. The process of claim 13 wherein contaminated pyrolytic oil condensed from said offgas stream is filtered to remove solid particles therefrom, thereby providing a filter cake and a pyrolytic oil product.

15. The process of claim 14 wherein said contaminated pyrolytic oil is hydrated prior to filtration, the water for said hydration being condensate obtained from said water condensation operation.

16. The process of claim 14 wherein said offgas stream is initially conveyed through ducting, and wherein said process includes the additional step of recycling a portion of said pyrolytic oil product to said ducting and washing the interior wall surfaces thereof therewith, thereby minimizing the buildup of condensates thereupon.

17. The process of claim 16 wherein the contaminated pyrolytic oil from said wall washing operation is combined with said contaminated pyrolytic oil condensed from said offgas stream, and is filtered together therewith.

18. The process of claim 14 wherein a portion of said pyrolytic oil product is combined with said contaminated oil prior to filtration, to adjust the bulk temperature thereof.

19. The process of claim 14 wherein said filter cake from said filtration operation is recycled to said bed for thermal treatment therein.

20. The process of claim 19 wherein said filter cake is introduced with said feed material into said top portion of said bed.

21. The process of claim 14 wherein a portion of said pyrolytic oil product is removed therefrom.

22. The process of claim 21 wherein said product oil contains about 12 to 20 percent of moisture, based upon the wet weight thereof, and has a temperature of about 60° to 115° Fahrenheit.

23. The process of claim 1 wherein said solid residue is removed as a product therefrom.

24. The process of claim 23 wherein, exclusive of water and water vapor, said residue product has a volatiles content of up to about 20 weight percent based upon the weight of said residue, and is substantially dry.

25. The process of claim 24 wherein said residue product has a temperature of about 220° to 280° Fahrenheit.

26. The process of claim 24 wherein said maximum bed temperature is less than about 1400° Fahrenheit, wherein said offgas temperature is about 250° to 400° Fahrenheit, and wherein said residue product has a volatiles content above about one percent.

27. The process of claim 26 wherein said maximum bed temperature is about 825° to 1200° Fahrenheit, wherein said offgas temperature is about 275° to 350° Fahrenheit, and wherein said residue product has a volatiles content above about 6 percent.

* * * * *

UNITED STATES PATENT AND TRADEMARK OFFICE
CERTIFICATE OF CORRECTION

PATENT NO. : 4,419,185
DATED : December 6, 1983
INVENTOR(S) : Mack D. Bowen et al It is certified that error appears in the above—identified patent and that said Letters Patent is hereby corrected as shown below:

Claim 7, line 2, insert after "preheating" the word

--gas--.

Signed and Sealed this

Twenty-seventh Day of March 1984

[SEAL]

Attest:

GERALD J. MOSSINGHOFF

Attesting Officer    Commissioner of Patents and Trademarks